United States Patent [19]
Ahnell et al.

[11] Patent Number: 5,348,753
[45] Date of Patent: * Sep. 20, 1994

[54] FOOD PROCESSING APPARATUS AND METHOD

[75] Inventors: Edward E. Ahnell; Ernest W. Curry, both of Wycoff, N.J.

[73] Assignee: Besst Frozen Products, Inc., Hackensack, N.J.

[ * ] Notice: The portion of the term of this patent subsequent to Jul. 20, 2010 has been disclaimed.

[21] Appl. No.: 47,186

[22] Filed: Apr. 16, 1993

Related U.S. Application Data

[63] Continuation of Ser. No. 882,155, May 13, 1992, Pat. No. 5,229,150, which is a continuation-in-part of Ser. No. 671,026, Mar. 18, 1991, Pat. No. 5,151,288, which is a continuation of Ser. No. 598,431, Oct. 16, 1990, Pat. No. 5,030,465.

[51] Int. Cl.⁵ .................... A23G 9/00; G05D 16/00
[52] U.S. Cl. .................... 426/231; 62/342; 165/40; 366/151; 366/161; 426/524
[58] Field of Search .......... 426/231, 519, 524; 165/40; 366/151, 153, 161, 181; 62/161, 342, 344

[56] References Cited

U.S. PATENT DOCUMENTS

| | | | |
|---|---|---|---|
| 130,473 | 8/1972 | Broughton | 366/328 |
| 1,882,660 | 10/1932 | Glauser | 62/343 |
| 2,713,253 | 7/1955 | Chandler | 62/342 |
| 2,914,385 | 11/1959 | Massey et al. | 366/328 |
| 3,004,404 | 10/1961 | Newby | 62/342 |
| 3,183,681 | 5/1965 | Lutz et al. | 62/342 |
| 3,296,817 | 1/1967 | Stoelting | 165/156 |
| 3,446,032 | 5/1969 | Bottum | 165/156 |
| 3,503,757 | 3/1970 | Rubenstein | 426/474 |
| 3,545,063 | 12/1970 | Mitchell | 165/156 |
| 3,626,709 | 12/1971 | Yuza | 62/343 |
| 3,660,988 | 5/1972 | Garavelli | 62/306 |
| 3,930,535 | 1/1976 | Menzel | 62/342 |
| 4,004,040 | 1/1977 | Puta | 426/474 |
| 4,201,558 | 5/1980 | Schwitters et al. | 62/342 |
| 4,241,590 | 12/1980 | Martineau | 62/343 |
| 4,551,025 | 11/1985 | Ames et al. | 62/342 |
| 4,650,343 | 3/1987 | Doom et al. | 366/330 |
| 4,758,097 | 7/1988 | Iles, Jr. | 62/342 |
| 4,887,911 | 12/1989 | Miyaji | 366/328 |
| 5,046,548 | 9/1991 | Tilly | 165/156 |

FOREIGN PATENT DOCUMENTS

| | | | |
|---|---|---|---|
| 1082576 | 6/1960 | Fed. Rep. of Germany | 366/327 |
| WO88/05095 | 7/1988 | World Int. Prop. O. | 162/6 |

*Primary Examiner*—George Yeung
*Attorney, Agent, or Firm*—Finnegan, Henderson, Farabow, Garrett & Dunner

[57] ABSTRACT

A food processing apparatus comprises a heat exchanger with a food path for connecting a source of food substance to the heat exchanger and a pump located in the food path for conveying food substance from the source to the heat exchanger. A pressure sensor is provided for sensing pressure downstream of the pump and for transmitting a pressure signal corresponding to a measured pressure downstream of the pump. A controller connected between the pump and the pressure sensor controls the pump in response to the pressure signal.

17 Claims, 4 Drawing Sheets

FOOD PROCESSING APPARATUS AND METHOD

RELATED APPLICATIONS

This is a continuation of application Ser. No. 07/882,155, filed May 13, 1992, and issued as U.S. Pat. No. 5,229,150 on Jul. 20, 1993; which is a continuation-in-part application of Ser. No. 07/671,026, filed Mar. 18, 1991, and issued as U.S. Pat. No. 5,151,288 on Sep. 29, 1992; which is a continuation of Ser. No. 07/598,431, filed Oct. 16, 1990, and issued as U.S. Pat. No. 5,030,465 on Jul. 9, 1991.

BACKGROUND OF THE INVENTION

1. Field of the Invention

The present invention relates to an apparatus and method for processing food products in a heat exchanger. Although suitable for many types of hot and cold food products, the apparatus is described in connection with frozen confections such as soft-serve sorbets and yogurts, for which it has particular advantages.

2. Description of the Related Art

Bacterial contamination is a significant concern with related art food processing machines. A typical related art commercial frozen confection machine contains four integrated systems; an insulated compartment for storing liquid food substances; a gas circuit for providing an edible gas for mixture with the liquid food substances; a production unit for making a frozen confection from the mixture of liquid and gas; and a refrigeration circuit for cooling both the insulated compartment and the production unit. If bacteria is able to enter the frozen confection machine through any one of these systems, health hazards may occur.

Many related art machines are open system devices wherein liquid food product is poured into an opened holding reservoir or is otherwise exposed to air from the surrounding atmosphere. Such structure not only increases the possibility that bacteria and foreign particles will contaminate the food product, but also allows odors in the surrounding atmosphere to be absorbed into the food product, degrading the taste of the end product. Many hospitals and other institutions that use odorous sanitizing chemicals avoid frozen confection machines in their cafeterias for this very reason.

In addition, the storage compartment is typically connected to the production unit by a tube which defines a food path. In order to minimize bacterial contamination within the system, it is desirable to minimize the length of the food path and the number of components through which the liquid food substance must pass before it is frozen in the production unit. However, even when shortened, nooks and crannies in the conventional food path provide a haven for bacterial growth. Therefore, related art machines must be flushed, disassembled, sanitized, and reassembled on a daily basis to avoid hazardous contamination. However, this cleaning operation is time consuming and often results in wasted food product.

A maintained positive system pressure is also critical to a bacteria free environment. While related art devices may use pumps to convey liquid food substance into a production unit, they may not be designed to always maintain a positive pressure in the system during use. Rather, they may fluctuate between positive pressure and atmospheric pressure, or may substantially operate at atmospheric pressure. If the pressure in the system falls to atmospheric pressure, contaminants may enter the system leading to bacterial growth. Thus, more frequent cleaning may be necessary to maintain a bacteria free environment.

Another problem with related art devices is their limited ability to control the uniform quality of their end product. The present inventors have recognized that there exists a direct relationship between the pressure within the heat exchanger and the resulting quality of the end product. Critical pressures vary depending upon the make-up of the food product and food product temperatures. However, in the related art, precise control of system pressure is difficult. In addition, the goal of keeping the food path free of elements that define nooks and crannies that permit bacterial growth, discourages the use of conventional pressure sensors within the system.

It is also important to precisely control the proportion of food product and gas entering the production unit in order to ensure the quality and consistency of the end product. Desired proportions may vary depending upon the make-up of the food product being used as well as control standards. However, related art devices lack the ability to precisely control the proportion of gas and food product that is sent to the production unit.

Finally, temperature control is also important to the quality of the end product. As the liquid food substance cools in the production unit, its ability to absorb and be become emulsified with the gas decreases. Thus, if a critical temperature is reached before the gas and liquid are fully emulsified, pockets of gas will form in the heat exchanger. When a dispensing valve on the production unit is opened, these pockets of gas may "blow-out," spewing-food product through the valve. In addition, product quality may be poor if full gas emulsification has not occurred.

In order to prevent blow-outs and to provide a fully emulsified product, the cooling rate may be decreased. However, the slower the mixture cools, the larger the crystal size in the end product. Since smaller crystal size results in a smoother textured end product, a fast cooling rate is desirable.

Some related art devices separately inject the liquid and gas into the production unit, and some include premixing units or saturators in the food path for mixing the liquid and gas before it enters the cooled environment of the production unit. A drawback of premixing units is that they provide additional nooks and crannies within the food path that may trap food particles and thereby lead to bacterial growth.

Thus, a major drawback of related art devices is their inability to accurately control pressure, temperature and the ratio of food substance to gas, while at the see time maintaining a virtually bacteria free environment.

SUMMARY OF THE INVENTION

An object of the present invention is to provide a food processing apparatus and method that illuminates nooks and crannies along its food path for minimizing the possibility of bacterial growth, for permitting the apparatus to run for extended periods of time between cleanings, and for permitting the apparatus to be cleaned by flushing without disassembly.

Another object of the present invention is to provide an apparatus and method that permits precise control over system pressure.

A further object of the present invention is to provide an apparatus and method that provides precise control over production unit temperature.

An additional object of the present invention is to provide an apparatus and method that permits the proportionate mixture of food substance and gas to be precisely controlled.

In addition, it is an object of the present invention to provide an apparatus and method that simultaneously regulates temperature, pressure and gas injection to optimize the efficiency of the system while at the see time ensuring a quality end product.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the food processing apparatus comprises a heat exchanger having food path means for connecting a source of food substance to the heat exchanger. Pump means is located in the food path means for conveying food substance from a source of food substance to the heat exchanger. The invention also includes first means for sensing pressure downstream of the pump means and for transmitting a pressure signal corresponding to the measured downstream pressure. Finally, control means is connected between the pump means and the pressure sensing means for controlling the pump means in response to the pressure signal.

A food processing method of the invention comprises the steps of supplying a food substance to a heat exchanger using a pump, detecting a pressure downstream of the pump, and controlling the pump in accordance with the downstream detected pressure.

It is to be understood that both the foregoing general description and the following detailed description are exemplary only and are not restrictive of the invention, as claimed.

The accompanying drawings which are incorporated in and constitute a part of this specification illustrate one embodiment of the invention and together with the description serve to explain the principles of the invention,

DESCRIPTION OF THE PREFERRED EMBODIMENT

Reference will now be made in detail to the present preferred embodiment of the invention, an example of which is illustrated in the accompanying drawings.

Figure 1:
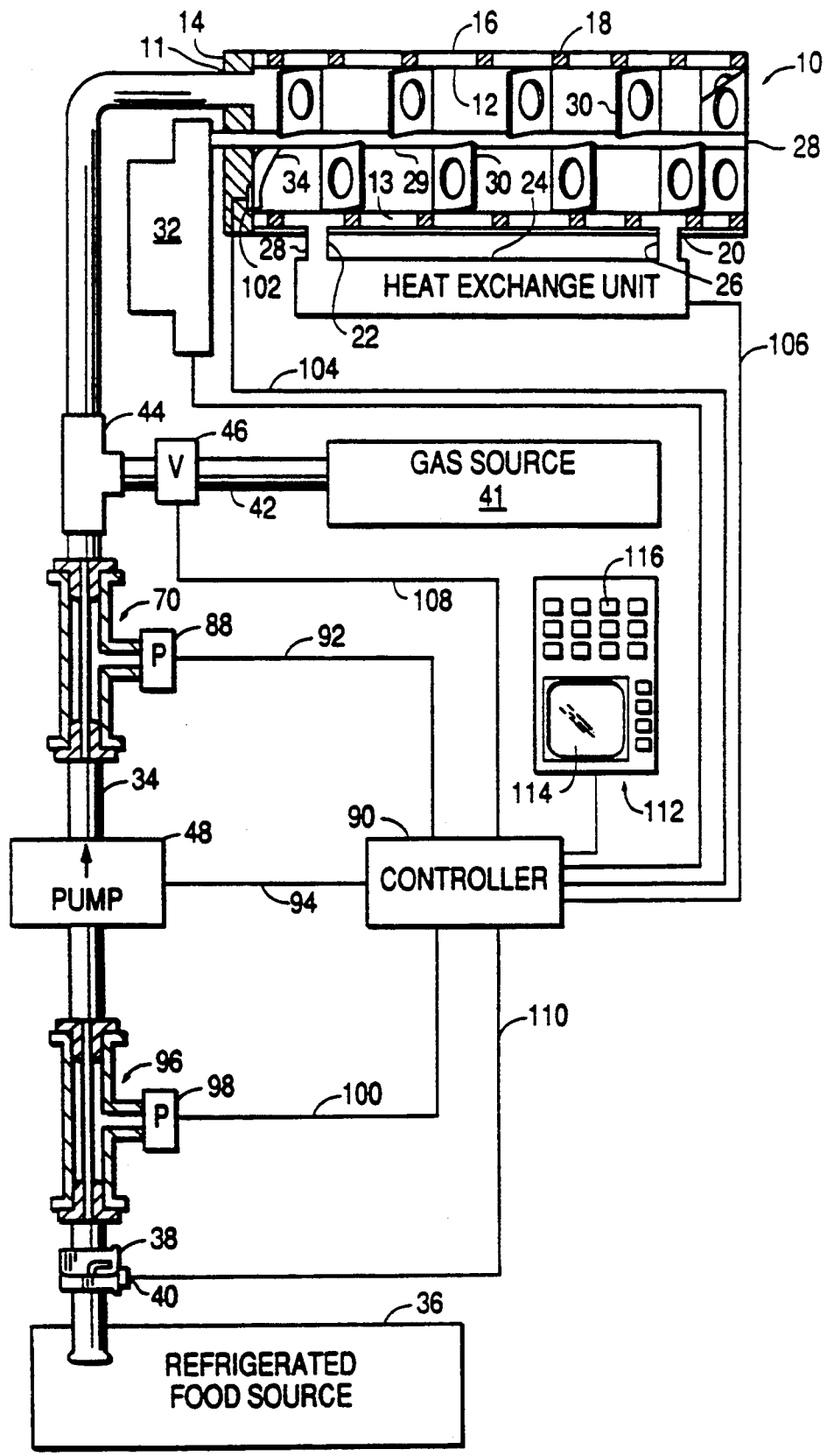
FIG. 1 is a schematic diagram depicting the interconnection of various components of a food processing apparatus in accordance with the present invention.

In accordance with the present invention there is provided a food processing apparatus including a heat exchanger. As embodied herein and as depicted in FIG. 1, the food processing apparatus of the present invention includes heat exchange assembly 10. This apparatus is described in detail in related U.S. Pat. No. 5,030,465 which is incorporated herein by reference. Therefore, for the sake of brevity, only structure that differs from the incorporated disclosure is fully discussed herein.

Heat exchanger 10 includes an inner stainless steel tube 12 having a food grade plastic block 14 affixed to the inlet end thereof. An outer stainless steel tube 16 is arranged about inner tube 12, and a coiled spacer 18 is located between the inner and outer tubes.

An auger 28 is disposed within the inner tube 12 and includes shaft 29 with a plurality of fins 30 extending therefrom. Each of fins 30 includes an opening therein and each are oriented to simultaneously propel food substance in a first direction toward an outlet end of the heat exchanger and in a second direction toward the inlet end thereof.

Figure 3A:
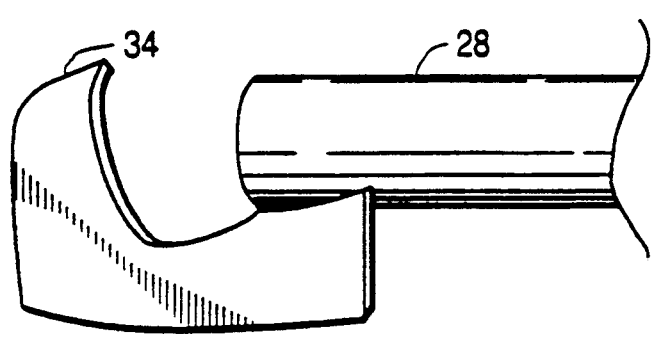
FIG. 3a is a rear section of the auger of FIG. 1 as viewed from the side.
Figure 3B:
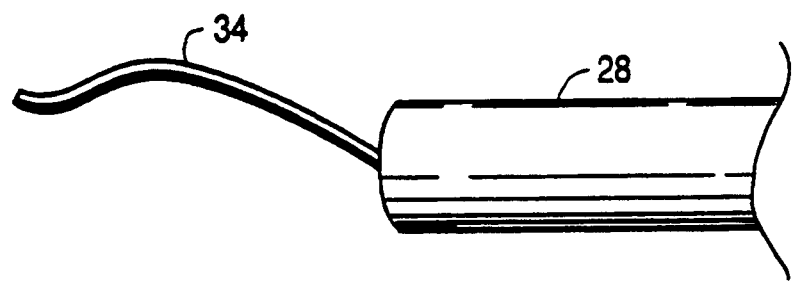
FIG. 3b depicts the auger of FIG. 3a rotated axially by approximately 90°.

Motor 32, located adjacent heat exchange assembly 10, selectively rotates auger 28. Auger 28 also includes an elongated scooper fin 34 disposed at the inlet end of heat exchange device 10 and extending toward plastic block 14. During rotation of auger 28, scooper fin 34 draws stagnating mixture away from block 14 and insures that gas pockets do not form toward the inlet end of inner tube 12. To facilitate this function, scooper fin 34 may be curled as shown in FIGS. 3a and 3b.

An inlet port 20 and an outlet port 22 are disposed in outer tube 16 and are connected to heat exchange circuit 24 via conduit 26 and 28, respectively. Heat exchange circuit 24 may include a standard refrigeration circuit including a compressor. An air cooled condensing section having a 1.5 hp motor and rated at 7800 btu's has proven to be effective for the manufacture of frozen confections. The desired level of heat exchange depends upon the ingredients of the liquid food substance. However, with most frozen sorbets and yogurts, it is desirable to cool the mixture to between 10° F. and 0° F., preferably about 9° F.

Heat exchange circuit 24 circulates a heat exchange liquid such as freon through space 13 between inner and outer tubes 12 and 16. Spacer 18 directs fluid flow to evenly expose the exterior wall of inner tube 16 to heat exchange liquid.

As illustrated in FIG. 1, coiled spacer 18 is manufactured from an elongated strip of material that is rectangular in cross-section. This shape, as compared to a spacer constructed of a strip having a circular cross-section, provides a better seal for preventing leakage of heat exchange fluid between the coil windings. To further prevent leakage, coil 18 may be welded or otherwise affixed to inner tube 12. Thus, heat exchange liquid entering inlet port 20 is directed in a spiral pattern about the exterior of inner tube 12, evenly exposing the entire outer surface of inner tube 12 to heat exchanging liquid. In order to further increase heat exchange efficiency, a well known insulation such as Armaflex TM may be wrapped around heat exchange assembly 10.

When used with frozen confections, the above described arrangement is capable of cooling mixtures at an accelerated rate thereby inhibiting crystal growth and providing an end product with a smooth texture. Cooling rates are selectively variable depending upon the product being produced.

In accordance with the invention, there is also provided food path means for connecting a source of food substance to the heat exchanger. As embodied herein and as depicted in FIG. 1, the food path means includes food line 34 which connects the heat exchange assembly 10 to a refrigerated source of liquid food substance 36. The food path means may include tubing manufactured of nylon reinforced silicone. Preferably, food source 36 includes a 2½ gallon bag of liquid food substance connected to food line 34 with a connector 38 that forms an air-tight seal. A sensor 40 is located on connector 38 for detecting whether food line 22 is connected or disconnected from food source 36.

Preferably, the liquid food substances contains edible stabilizers that lower the freezing point of the liquid to below 10° F. Numerous commercial grade stabilizers are available with this characteristic. It is also preferred that food source bags be pasteurized and sealed at their place of manufacture to insure that they do not introduce bacterial contaminants into the system.

In order to ensure that the system does not provide a haven for bacterial growth, the food path is constructed of a smooth walled conduit, such as plastic tubing, and does not include uneven locations or "hard 90°" turns in which food product may stagnate or become lodged. Similarly, and as will be discussed later in greater detail, each of the components located in food line 34, which also makes up part of the food path means, does not include locations that are capable of trapping food substances.

A pressurized source of gas 41 (preferably pressurized oxygen) is connected via gas line 42 to food line 34 through a T-connector 44 disposed in food line 34. T-connector 44 connects gas line 42 to food line 34 at substantially a 90° angle. The 90° injection of gas produces turbulence in food line 34 which aids in mixing the liquid and gas.

A solenoid gas valve 46 is disposed in gas line 42 upstream of T-connector 44. A sparget is disposed in T-connector 44 for injecting gas into food line 34 and acts as a check valve to insure that food substance does not flow back into gas line 42.

Gas valve 46 injects gas into food line 34 to inflate food product. Valve 46 may be adjustable so that a desired volumetric ratio of gas to liquid food substance may be achieved. It is preferable to adjust valve 46 so that the ratio of gas to liquid food substance is at least about 1:1. Successful tests have also been achieved at levels as high as about 1.4:1. A high gas inflation ratio serves two important purposes. First, it greatly increases the amount of end product that can be produced from a given volume of liquid food substance. Second, it lowers the density of the end product to provide a smoother texture.

Figure 4:
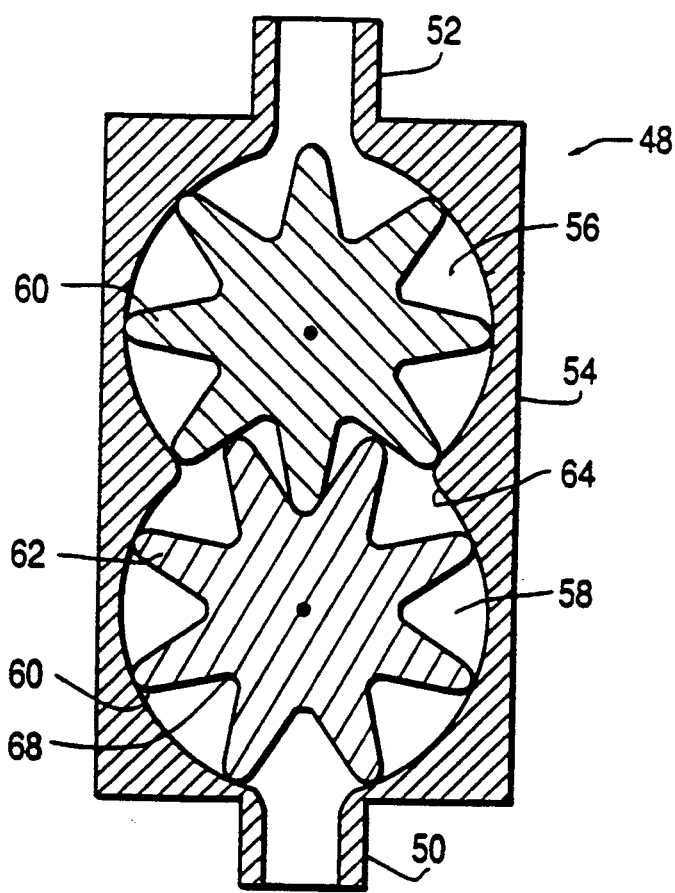
FIG. 4 is a cross-sectional view of a gear pump in accordance with the present invention.

In accordance with the invention, there is provided pump means located in the food path means for conveying food substance from the source to the heat exchanger. As embodied herein, and as illustrated in FIGS. 1 and 4, the pump means includes a gear pump 48 having an inlet port 50 and an outlet port 52, and being connected in the food line 34. Gear pump 48 includes a housing 54 having openings 56 and 58 for receiving gears 60 and 62, respectively. A motor (not shown) rotates gears 60 and 62 to cause a negative pressure at inlet port 50 and a positive pressure at outlet port 52. In this manner, when pump 48 is activated, it pumps liquid food substance from food source 36 into heat exchange assembly 10.

Gear pump 48 forms a portion of the food path and is constructed without nooks and crannies in which food can become lodged and bacteria can grow. Specifically, the gear pump of the present invention includes internal walls 64 that are rounded, and gear teeth having distal ends 66 that are rounded, the adjacent teeth of the gears being connected at rounded connection locations 68. Thus, the inner surfaces of housing 54 and the teeth of gears 60 and 62 are smooth and do not include any "hard 90°" angles.

Typically, as food product pumps run over extended periods of time between cleanings, the amount of bacteria that grows within the pump increases. However, the gear pump described above can be run for days at a time without substantially any bacterial growth. In fact, the gear pump of the present invention meets the exacting clean-in-place requirements of the 3-A Sanitary Standards.

It must be noted that the pump means of the presently claimed invention is not limited to a gear pump, but may include other pumps such a diaphragm pump, systolic pump or a sine pump. In addition, while the above described gear pump is preferred, the claimed invention, in its broadest sense, may be practiced without a "low bacteria" pump.

Figure 2:
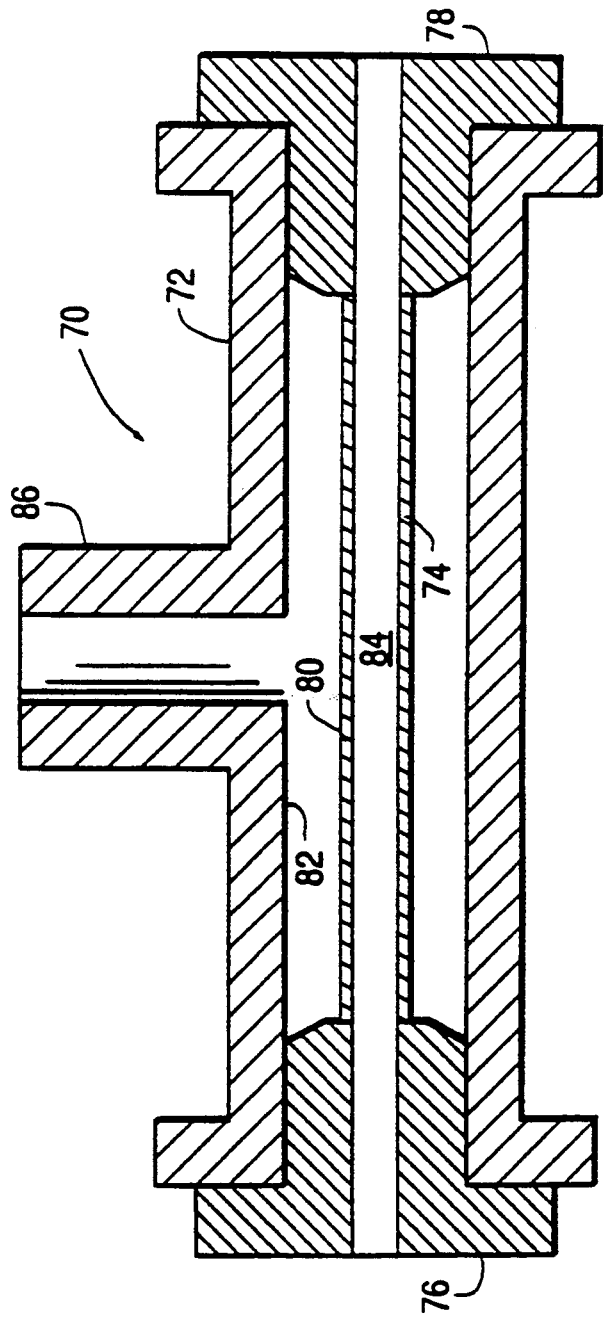
FIG. 2 is an elongated cross-sectional view of the gauge guard illustrated in FIG. 1.

In accordance with the present invention, there is also provided first means for sensing pressure downstream of the pump means and for transmitting a pressure signal corresponding to a measured pressure. As embodied herein, and as illustrated in FIGS. 1 and 2, the first pressure sensing means includes gauge guard 70 having a rigid outer body 72 and an expandable inner bladder 74.

Preferably, bladder 74 is manufactured from silicone, and is integrally formed with plugs 76 and 78 located at opposite ends of bladder 74 for maintaining bladder 74 within rigid body 72. Bladder 74 and plugs 76 and 78 define a smooth walled conduit 84 which forms a portion of the food path extending between food source 36 and heat exchange assembly 10. Bladder 74 includes an outer wall 80 which is spaced from an inner wall 82 of rigid body 72. Thus, when pressure builds within bladder 74, the walls of the bladder expand toward inner wall 82, creating a pressure within rigid body 72.

A port 86 is located in a wall of rigid body 72 and adjacent bladder 74. As illustrated in FIG. 1, a pressure sensor 88 is mounted on port 86. Pressure sensor 88 detects pressure changes within rigid body 72 that are due to the expansion and contraction of bladder 74, and transmits a pressure signal corresponding to the detected pressure. Pressure sensor 88 may be an off the shelf item such as a bellows type pressure switch. The use of gauge guard 70 to measure the line pressure is a non-invasive method. In other words, the pressure sensor is external to the food conduit and food product can pass through conduit 84 of gauge guard 70 without being obstructed by elements of a pressure sensor. This is important because if such elements were within the food conduit, they would provide locations in which food product could stagnate and bacteria could grow.

While the gauge guard arrangement described above is a preferred pressure measuring device, the invention, in its broadest sense, is not limited to use of this device. Other pressure sensing devices may be used. If another pressure sensing device is substituted, it is preferable but not necessary, that this device also be non-invasive. One example of such a device is a pressure sensor that detects fluctuations in pressure using optics and a beam that is irradiated through the food conduit. Another example is a pressure sensing device that attaches to the exterior of the food tube and senses pressure variations based upon expansion of the food tube.

Also in accordance with the present invention there is provided control means located between the pump means and the pressure sensing means for controlling the pump means in response to the pressure signal. As embodied herein, and as illustrated in FIG. 1, the control means includes controller 90, which includes, for example, a preprogrammed computer chip. Controller 90 is electrically connected through wire 92 to pressure sensor 88, and is programmed to activate the pump in response to predetermined pressure signals from pressure sensor 88. For example, controller 90 may be programmed to activate pump 48 when the pressure in food line 34 upstream of pump 48 falls below a predetermined minimum level, such as 25 psi. Controller 90 maintains pump 48 in an operating condition until the food line pressure downstream of pump 48 reaches a predetermined upper limit, such as 35 psi. When this occurs, controller 90 sends a deactivating signal to pump 48 through wire 94. Since heat exchange assembly 10 is connected to food line 34, the pressure in food line 34 downstream of pump 48 should be substantially the same as the pressure within heat exchange assembly 10. Therefore, using the pressure control system described above, pressure may be accurately controlled within heat exchange assembly 10.

The present invention may also include second pressure sensing means located in the food path means upstream of the pump means, for transmitting a pressure signal corresponding to a measured pressure in the food path means upstream of the pump means. As embodied herein, and as illustrated in FIG. 1, the second pressure sensing means includes a second gauge guard 96 similar to gauge guard 70, and located upstream of pump 48. Gauge guard 96 includes a pressure sensor 98, connected to controller 90 through wire 100, and which functions in a manner similar to pressure sensor 88. When controller 90 receives a pressure signal corresponding to a vacuum in line 34 upstream of pump 48, such a signal indicates that the food source 36 is empty, and controller 90 sends a deactivation signal to turn off pump 48.

Not only does controller 90 regulate pump 48, it also controls other elements of the system as well. For example, controller 90 may be programmed to control heat exchanger circuit 24, gas injection valve 46, and an emergency shut off system as Heat exchanger temperature is monitored by a temperature sensor 102 embedded in plastic block 14. Temperature sensor 102 is connected via wire 104 to controller 90. Similarly, wire 106 connects controller 90 to heat exchange circuit 24. With this arrangement, controller 90 regulates heat exchange circuit 24 in accordance with a predetermined program. When temperature sensor 102 detects a temperature in heat exchange assembly 10 that falls outside of a predetermined range, a signal is sent to the heat exchange circuit to adjust the temperature accordingly.

Gas valve 46 is connected to controller 90 through wire 108 so that gas injection can also be controlled in accordance with a predetermined program. Preferably, the program of controller 90 begins the flow of gas into food line 34 simultaneously with activation of pump 48.

Controller 90 may also be programmed to automatically shut off pump 48 if the food source 36 is disconnected from food line 34. This is especially important when pump 48 is a gear pump because gear pumps tend to burn out rather quickly during dry runs. Thus, the emergency shut-off system of the present invention includes a sensor 40 located on connector 38 for detecting whether food line 34 is connected to food source 36. Sensor 40 is connected to controller 90 through wire 110, and transmits a disconnect signal to the controller which in turn shuts off pump 48.

Controller 90 may also be connected to both a pH sensor and a temperature sensor (both not shown) located near the beginning of food path 34. Use of these sensors can ensure that cleaning of the food processing apparatus is properly performed. For example, if a user attempts to use an overly diluted cleaning solution, use of the pH sensor can prevent the cleaning process from continuing until the proper solution is provided. In addition, if the cleaning solution is outside of a predetermined temperature range, the temperature sensor at the beginning of the food line can send a signal to the controller to prevent operation of the pump 48. This is especially useful in preventing damage to the internal components of the machine that can occur through the use of overly heated cleaning solutions.

Desired temperatures and pressures can change depending upon the food product being used and the desired characteristics of the end product. In order to alter the program of controller 90 which controls system temperatures and pressures, the present invention provides a control panel 112. Control panel 112 includes a series of buttons 116, and a video screen 114 for prompting a user and for providing status information.

Operation of the system will now be described in connection with FIG. 1. Initially, when the system is turned on, controller 90 checks its memory to determine the last time the system was cleaned. If cleaning is necessary, a cleaning prompt will appear on screen 114 and the controller will prevent production of food product until cleaning occurs. If no cleaning is necessary, the controller runs through a check of all of the systems. Assuming that all systems are functioning properly and food line 34 is connected to a food source 36, controller 90 activates the refrigeration circuit 24 and auger motor 32. Subsequently, pump 48 is activated and valve 46 is simultaneously opened to provide a mixture of food substance and gas to heat exchanger 10. When a desired pressure is reached in heat exchanger 10, controller 90, having received a pressure signal from pressure sensor 88, shuts off pump 48 and gas valve 46. After food product is dispensed from heat exchanger 10, and the pressure drops to below a predetermined level, controller 90 reactivates pump 48 and opens gas valve 46 to refill heat exchanger 10. This process continues until pressure sensor 98 senses a vacuum indicative of an empty food source. When this occurs, controller 90 shuts off pump 48 and signals the user via video screen 114 to replace the food source.

After a predetermined period of usage, the controller is programmed to prevent further food production until the machine is cleaned. In order to clean the machine, the food source is replaced with a source of cleaning solution. A pH sensor (not shown) tests the cleaning solution to determine whether or not its strength is sufficient to perform adequate cleaning. Similarly, a temperature sensor tests the temperature of the cleaning solution to ensure that it is within a desired range. Controller 90 then takes the machine through a predetermined cleaning process signalling the user via video screen 114 when the heat exchanger 10 should be emptied. At the completion of the cleaning process, the user is again signalled via video screen 114 that a source of food substance can be reconnected to food line 34.

When the apparatus is used for the first time after a cleaning operation, controller 90 may be programmed not to inject gas into food line 34 for a period of time or to inject a limited amount of gas for a period of time. This is because after cleaning, heat exchanger 10 is filled with air, and this air is whipped into and inflates the food substance. If the regular amount of gas were added to the food substances while the heat exchanger is filled with air, the end product would become over inflated.

The method of the present invention comprises supplying food substance to a heat exchanger using a pump. As described earlier, food substance from source 36 is supplied to heat exchanger 10 via pump 48.

The method of the present invention also includes detecting a pressure downstream of the pump. As embodied herein, and as described earlier, pressure detection occurs via gauge guard 70 and pressure sensor 88 located in food line 34 downstream of pump 48. However, downstream pressure measurement need not be detected in the food line 34, but could instead be detected directly within heat exchange assembly 10.

Finally, the method of the invention comprises the step of controlling the pump in accordance with the downstream detected pressure. As previously described, controller 90 activates and deactivates pump 48 in response to pressure signals from sensor 88 and in accordance with a predetermined program. In this manner system pressure can be precisely controlled.

Other embodiments of the present invention will be apparent to those skilled in the art from consideration of the specification and practice of the invention disclosed herein. It is intended that the specification and examples be considered as exemplary only with a true scope and spirit of the invention being indicated by the following claims.

We claim:

1. A food processing apparatus comprising:
   a heat exchanger;
   a food path connecting a source of food substance to the heat exchanger;
   a pump operatively connected to the food path for moving food substance from the source to the heat exchanger;
   a pressure sensor operatively connected to at least one of the food path and the exchanger, for transmitting a pressure signal corresponding to a system pressure; and
   a controller connected to the pump and to the pressure sensor for controlling the pump in response to the pressure signal.

2. An apparatus according to claim 1 wherein the pressure sensor is a non-invasive type device.

3. An apparatus according to claim 1 further including a gas injector for introducing gas into the food substance, the gas injector being activatable in response to a signal from the controller.

4. An apparatus according to claim 3 wherein the controller transmits an activation signal to the gas injector in response to a predetermined pressure signal from the pressure sensor.

5. An apparatus according to claim 3 wherein the controller sends signals to simultaneously activate both the pump an the gas injector in response to a predetermined pressure signal from the pressure sensor.

6. An apparatus according to claim 1 wherein the heat exchanger includes an auger for simultaneously propelling food substance in a first direction toward an outlet end thereof and in a second direction toward an inlet end thereof.

7. An apparatus according to claim 6 wherein the auger includes a plurality of fins.

8. An apparatus according to claim 1 wherein the pump is a gear pump.

9. An apparatus according to claim 1 wherein the pressure sensor includes a gauge guard.

10. An apparatus according to claim 1 wherein the control is adjustable to activate the pump in response to a user selected pressure.

11. An apparatus according to claim 1 further including a food substance temperature sensor, said temperature sensor being located in said heat exchanger and for transmitting a temperature signal to the controller.

12. An apparatus according to claim 10 wherein the controller includes a program which can be altered by a user.

13. An apparatus according to claim 1 further including a display connected to the controller for indicating status information to a user.

14. An apparatus according to claim 13 wherein the display includes a video screen.

15. An apparatus according to claim 3 wherein the gas injector includes a sparger.

16. An apparatus according to claim 1 further including a sensor for detecting whether the food path is connected to a food source and for transmitting a disconnect signal to the controller for deactivating the pump.

17. A method for processing food substance in a system using a heat exchanger, the method comprising the steps of:
   supplying a food substance to the heat exchanger;
   detecting a system pressure;
   controlling the step of supplying in accordance with the detected system pressure; and
   processing the food substance in the heat exchanger.

* * * * *

UNITED STATES PATENT AND TRADEMARK OFFICE
CERTIFICATE OF CORRECTION

PATENT NO. : 5,348,753

DATED : September 20, 1994

INVENTOR(S) : Edward E. Anhell et al.

It is certified that error appears in the above-indentified patent and that said Letters Patent is hereby corrected as shown below:

Claim 10, column 10, line 25, change "control" to read —controller—.

Signed and Sealed this

Fifteenth Day of November, 1994

Attest:

BRUCE LEHMAN

Attesting Officer

Commissioner of Patents and Trademarks